US009104910B2

(12) United States Patent
Huang et al.

(10) Patent No.: US 9,104,910 B2
(45) Date of Patent: Aug. 11, 2015

(54) DEVICE AND METHOD FOR DETERMINING GESTURE AND OPERATION METHOD OF GESTURE DETERMINING DEVICE

(71) Applicant: PixArt Imaging Inc., Hsinchu (TW)

(72) Inventors: Yu-Hao Huang, Hsinchu (TW); Ming-Tsan Kao, Hsinchu (TW); Sen-Huang Huang, Hsinchu (TW); Nien-Tse Chen, Hsinchu (TW); En-Feng Hsu, Hsinchu (TW); Meng-Huan Hsieh, Hsinchu (TW); Yi-Yuan Chen, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 258 days.

(21) Appl. No.: 13/900,503

(22) Filed: May 22, 2013

(65) Prior Publication Data

US 2014/0161310 A1  Jun. 12, 2014

(30) Foreign Application Priority Data

Dec. 7, 2012  (TW) .............................. 101146110 A

(51) Int. Cl.
*G06K 9/00* (2006.01)
*G06F 3/01* (2006.01)

(52) U.S. Cl.
CPC ............ *G06K 9/00389* (2013.01); *G06F 3/017* (2013.01); *G06K 9/00335* (2013.01); *G06K 9/00355* (2013.01); *G06T 2207/30196* (2013.01)

(58) Field of Classification Search
CPC .......... G06K 9/00335; G06K 9/00355; G06K 9/00389; G06F 3/017; G06T 2207/30196
See application file for complete search history.

(56) References Cited

U.S. PATENT DOCUMENTS

| 6,028,960 A * | 2/2000 | Graf et al. ...................... 382/203 |
| 6,512,838 B1 * | 1/2003 | Rafii et al. ..................... 382/106 |
| 7,519,223 B2 * | 4/2009 | Dehlin et al. .................. 382/203 |

(Continued)

FOREIGN PATENT DOCUMENTS

| TW | 201126397 A1 | 8/2011 |
| TW | 201128541 A1 | 8/2011 |

OTHER PUBLICATIONS

Yeung et al., "Vision-Based Hand Gesture Interactions for Large LCD-TV Display Tabletop Systems", Advances in Multimedia Information Processing—PCM 2008 Lecture Notes in Computer Science vol. 5353, 89-98.*

(Continued)

*Primary Examiner* — Katrina Fujita
(74) *Attorney, Agent, or Firm* — Cheng-Ju Chiang

(57) ABSTRACT

A device for determining a gesture includes a light emitting unit, an image sensing device and a processing circuit. The light emitting unit emits a light beam. The image sensing device captures an image of a hand reflecting the light beam. The processing circuit obtains the image and determine a gesture of the hand by performing an operation on the image; wherein the operation includes: selecting pixels in the image having a brightness greater than or equal to a brightness threshold; sorting the selected pixels; selecting a first predetermined percentage of pixels from the sorted pixels; dividing the adjacent pixels in the first predetermined percentage of pixels into a same group; and determining the gesture of the hand according to the number of groups of pixels. A method for determining a gesture and an operation method of the aforementioned device are also provided.

20 Claims, 5 Drawing Sheets

(56) References Cited

U.S. PATENT DOCUMENTS

| | | | |
|---|---|---|---|
| 8,014,567 B2 * | 9/2011 | Yoon et al. | 382/103 |
| 8,606,022 B2 * | 12/2013 | Yokono | 382/225 |
| 8,750,573 B2 * | 6/2014 | Ming-Chang et al. | 382/107 |
| 8,923,559 B2 * | 12/2014 | Kimura et al. | 382/103 |
| 2011/0175849 A1 | 7/2011 | Ko | |
| 2011/0187679 A1 | 8/2011 | Ko | |
| 2011/0239118 A1 * | 9/2011 | Yamaoka et al. | 715/709 |
| 2013/0057469 A1 * | 3/2013 | Ajika | 345/156 |

OTHER PUBLICATIONS

Yoda et al., "Utilization of Stereo Disparity and Optical Flow information for Human Interaction", Computer Vision, 1998. Sixth International Conference on, 1109-1114.*

* cited by examiner

DEVICE AND METHOD FOR DETERMINING GESTURE AND OPERATION METHOD OF GESTURE DETERMINING DEVICE

TECHNICAL FIELD

The present invention relates to an optical touch technology, and more particularly to device and method for determining a gesture and an operation method of a gesture determining device.

BACKGROUND

The existing optical gesture determining device is realized by first capturing an image of a hand by an employed image sensing device and determining the gesture of the hand according to the captured image. Thus, the electronic apparatus employing the aforementioned optical gesture determining device can perform a corresponding operation according to a gesture determining result issued from the gesture determining device.

However, to make the gesture determination, the existing gesture determining device needs to perform some complicate operations, such as object detection, edge detection, concave and convex polygons calculation on the captured image. Thus, the existing gesture determining device has relatively low gestures determination speed.

SUMMARY OF EMBODIMENTS

Therefore, the present invention provides device and method for determining a gesture without some complicate operations, such as the object detection, edge detection, concave and convex polygons calculation, and thereby having improved gestures determination speed.

The present invention further provides an operation method corresponding to the aforementioned gesture determining device.

The present invention still further provides an operation method of a gesture determining device.

An embodiment of the present invention provides a device for determining a gesture, which includes a light emitting unit, an image sensing device and a processing circuit. The light emitting unit is configured to emit a light beam. The image sensing device is configured to capture an image of a hand reflecting the light beam. The processing circuit, electrically connected to the image sensing device, is configured to obtain the image and determine a gesture of the hand by performing an operation on the image; wherein the operation includes steps of: selecting pixels in the image having a brightness greater than or equal to a brightness threshold; sorting the selected pixels; selecting a first predetermined percentage of pixels from the sorted pixels; dividing the adjacent pixels in the first predetermined percentage of pixels into a same group; and determining the gesture of the hand according to the number of groups of pixels.

Another embodiment of the present invention provides an operation method for a gesture determining device. The gesture determining device includes a light emitting unit and an image sensing device. The operation method includes steps of: configuring the light emitting unit to emit a light beam to illuminate a hand; configuring the image sensing device to capture an image of the hand reflecting the light beam; selecting pixels in the image having a brightness greater than or equal to a brightness threshold; sorting the selected pixels; selecting a first predetermined percentage of pixels from the sorted pixels; dividing the adjacent pixels in the first predetermined percentage of pixels into a same group; and determining a gesture of the hand according to the number of groups of pixels.

Still another embodiment of the present invention provides a method for determining a gesture, which includes steps of: emitting a light beam to illuminate a hand; capturing an image of the hand reflecting the light beam; selecting pixels in the image having a brightness greater than or equal to a brightness threshold; sorting the selected pixels; selecting a first predetermined percentage of pixels from the sorted pixels; dividing the adjacent pixels in the first predetermined percentage of pixels into a same group; and determining a gesture of the hand according to the number of groups of pixels.

In summary, by sequentially emitting a light beam to illuminate a hand, capturing an image of the hand reflecting the light beam, selecting pixels in the image having a brightness greater than or equal to a brightness threshold, sorting the selected pixels, selecting a first predetermined percentage of pixels from the sorted pixels and dividing the adjacent pixels in the first predetermined percentage of pixels into a same group, the present invention can determine a gesture of the hand according to the number of groups of pixels without some complicate operations, such as the object detection, edge detection, concave and convex polygons calculation. Thus, the present invention has improved gestures determination speed.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
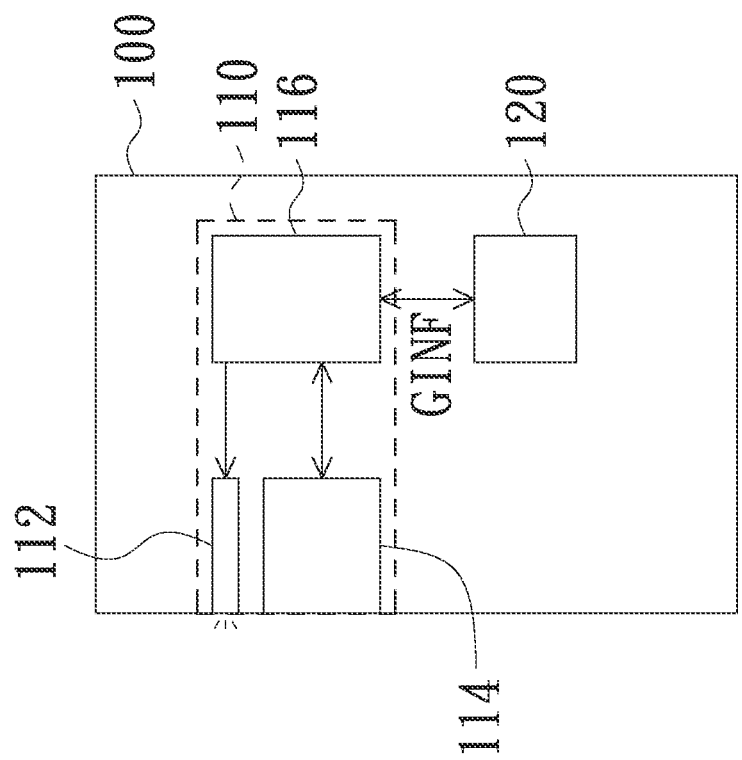
FIG. 1 is a schematic cross-sectional side view of an electronic apparatus.
Figure 1:
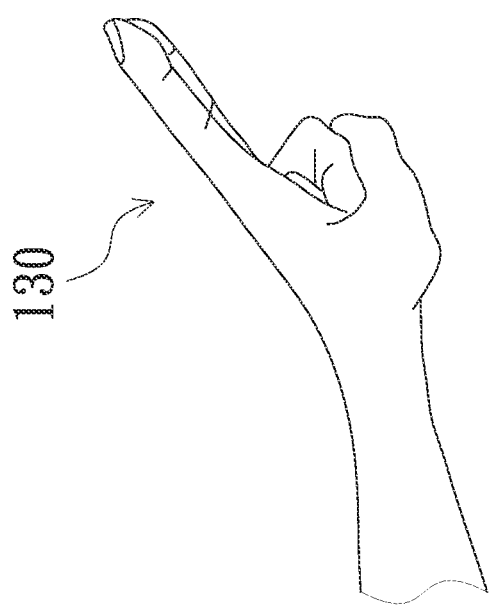

FIG. 1 is a schematic cross-sectional side view of an electronic apparatus 100, which is, for example, a portable electronic device such as a smart phone, a tablet PC, a notebook, or an electronic device with computing functions, such as a multimedia player apparatus. As shown in FIG. 1, the electronic apparatus 100 adopts a gesture determining device 110 in accordance with an embodiment of the present invention;

wherein the gesture determining device 110 is electrically connected to a processor 120 of the electronic apparatus 100.

The gesture determining device 110 includes a light emitting unit 112, an image sensing device 114 and a processing circuit 116. The light emitting unit 112 is configured to emit a light beam to illuminate an object 130 (for example, a user's hand). The image sensing device 114 is configured to capture an image of the hand 130 reflecting the light beam. The processing circuit 116, electrically connected to the image sensing device 114, is configured to obtain the image captured by the image sensing device 114. Furthermore, the processing circuit 116 may be further electrically connected to the light emitting unit 112 thereby being further configured to control ON/OFF of the light emitting unit 112 or even to control the brightness of the light beam emitted from the light emitting unit 112.

Figure 2:
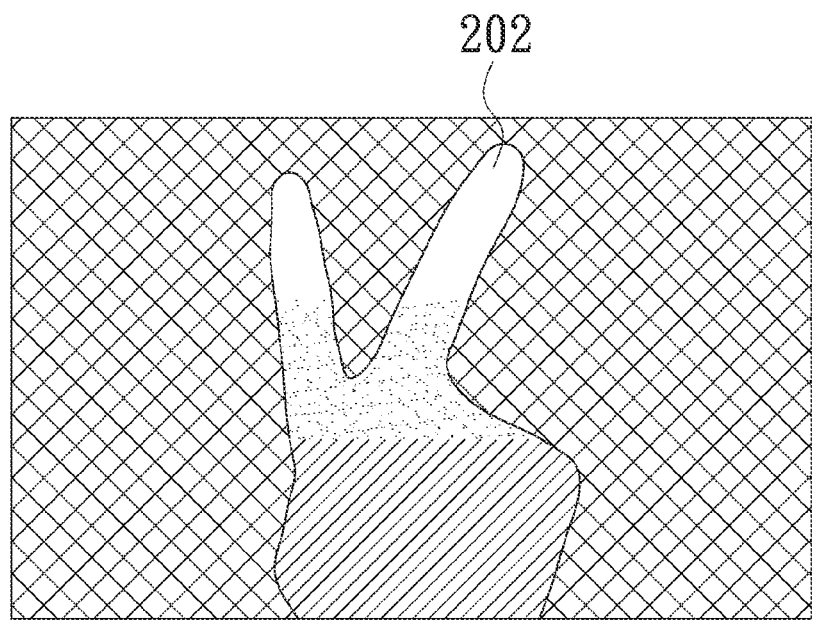
FIG. 2 is an exemplary image captured by an image sensing device arranged in a gesture determining device in accordance with an embodiment of the present invention.

The function of the processing circuit 116 will be exemplarily described in the following description with a reference of an image shown in FIG. 2. The hand image 202, illustrated in FIG. 2 and captured by the image sensing device 114, is composed by a plurality of pixels (for example, composed by 800×600 pixels). In addition, for a convenience, the image shown in FIG. 2 is presented by four areas different in brightness, which are: the brightest area (denoted by an area with no pattern therein), the sub-brightest area (denoted by an area with a dotted pattern therein), the sub-darkest area (denoted by an area with a slash pattern therein) and the darkest area (denoted by an area with a cross-hatched pattern therein). The brightest area has a first luminance; the sub-brightest area has a second luminance; the sub-darkest area has a third luminance; and the darkest area has a fourth luminance. As shown in FIG. 2, the hand image 202 is composed by three areas different in brightness due to these three areas have different distances relative to the light emitting unit 112. In addition, because there is no object existed near the hand to reflect the light beam emitted from the light emitting unit 112, the area outside the hand image 202 has the darkest brightness.

Figure 3:
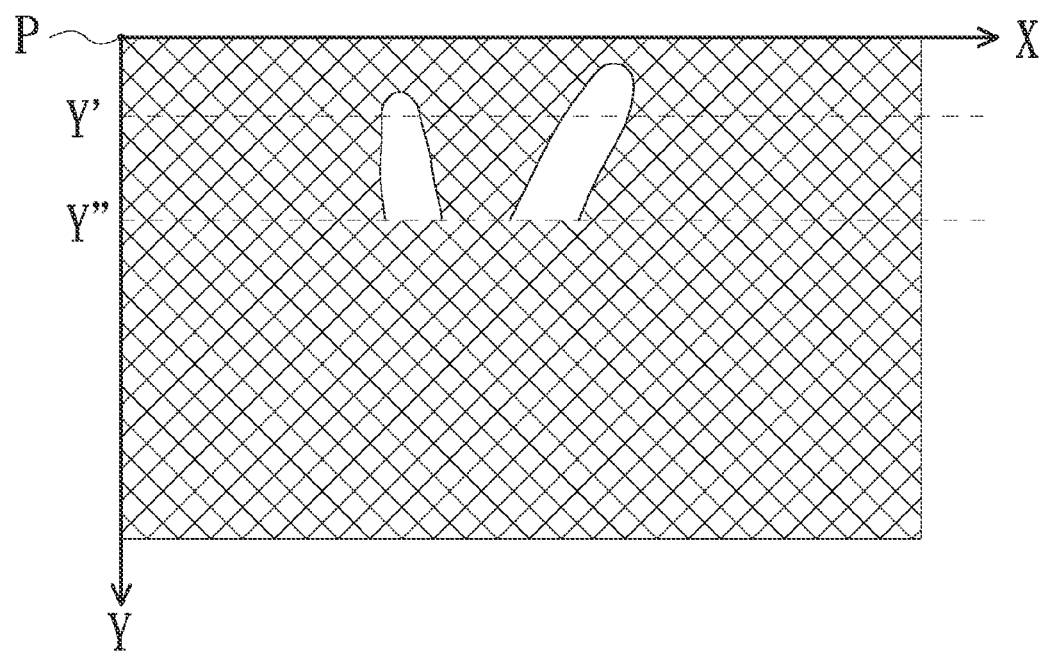
FIG. 3 is an exemplary pixels selected by one specific step performed by a processing circuit of the gesture determining device.

Please refer to FIGS. 1 and 2 both. The processing circuit 116, after obtaining the image shown in FIG. 2 from the image sensing device 114, is further configured to determine a gesture of the hand 130 by processing the image shown in FIG. 2. Specifically, the processing circuit 116 first selects all the pixels in this obtained image having brightness greater than or equal to a brightness threshold; wherein the brightness threshold can be selected based on an actual design requirement. For example, if the brightness threshold is located between the first luminance and the second luminance, the processing circuit 116 accordingly selects all the pixels in the brightest area (denoted by the area with no pattern therein), as illustrated in FIG. 3. As shown, the image shown in FIG. 3 is displayed in a rectangular coordinate system and the position where the upper-left-most pixel located is referred to as an origin point P of the rectangular coordinate system. It is understood that the position relationship between the image and the rectangular coordinate system herein is for exemplary only, and the present invention is not limited thereto.

Figure 4:
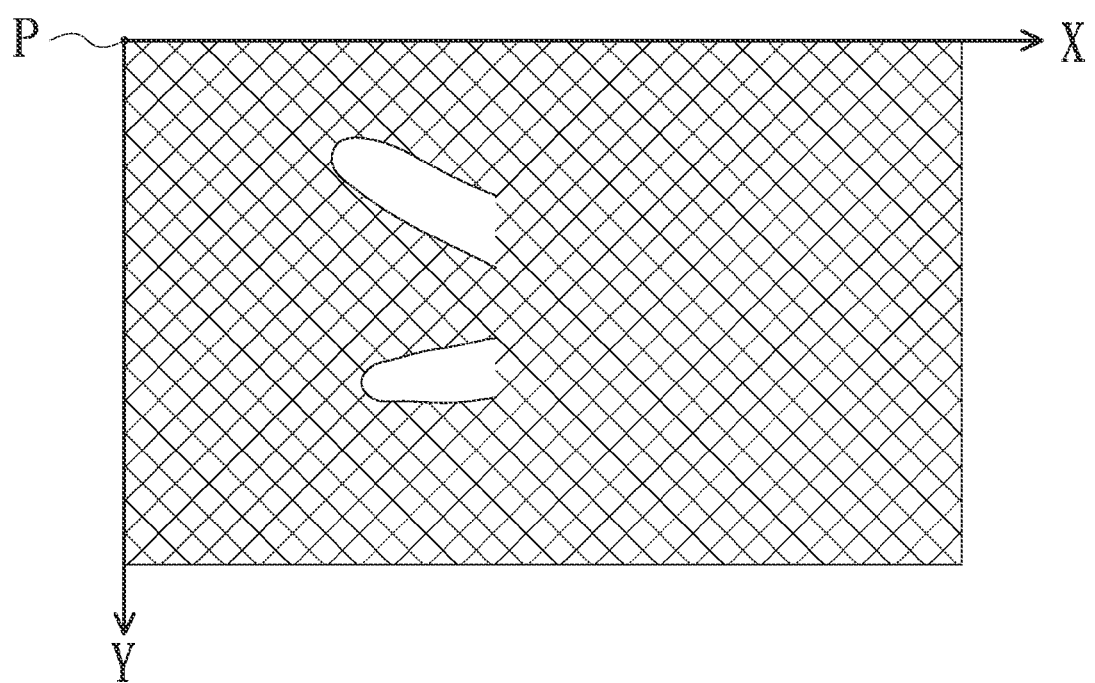
FIG. 4 is an exemplary pixels selected by one specific step performed by a processing circuit of the gesture determining device.

Please refer to FIGS. 1 and 3 both. The processing circuit 116, after selecting all the pixels in the brightest area (denoted by the area with no pattern therein) as illustrated in FIG. 3, is further configured to sort these selected pixels; wherein the pixel sorting is performed along the X-axis, the Y-axis, or based on the brightness of the selected pixels. For example, if the pixel sorting is performed along the Y-axis, the processing circuit 116 accordingly sorts the selected pixels in top-to-bottom and left-to-right manners. It is to be noted that the sorting manner may be set depended on the imaging way of the hand image 202. For example, for the image shown in FIG. 4, performing the pixel sorting along the X-axis (e.g., from left to right and from top to bottom) is a proper selection; and performing the pixel sorting along the Y-axis (e.g., from top to bottom) is a proper selection, for the image shown in FIG. 3.

Please refer to FIGS. 1 and 3 again. The processing circuit 116, after performing the pixel sorting in top-to-bottom and left-to-right manners, is further configured to select the first predetermined percentage of pixels from all the sorted pixels. For example, as illustrated in FIG. 3, the sorted pixels are located between the original point P and the line Y″ and the first predetermined percentage of sorted pixels are located between the original point P and the line Y′. The predetermined percentage in this embodiment can be selected based on an actual design requirement; for example, the predetermined percentage can be set to 20% and accordingly the processing circuit 116 selects the first 20% of pixels from all the sorted pixels. After selecting the first predetermined percentage of sorted pixels, the processing circuit 116 is further configured to divide the adjacent pixels in the first predetermined percentage into the same group, and thereby determining the gesture of the hand 130 based on the number of groups of pixels. For example, as illustrated in FIG. 3, the first predetermined percentage of pixels are divided into two groups, and the processing circuit 116 accordingly determines the gesture of the hand 130 according to the number of two.

The correspondence relationship between the number of groups of pixels and the gesture can be recorded in a look-up table. The look-up table may be stored in a built-in memory space of the processing circuit 116 or stored in a memory device (not shown) electrically connected to the processing circuit 116 and for storing the correspondence relationship between the number of groups of pixels and the gesture compared and searched by the processing circuit 116. It is understood that the look-up table is an exemplary mean, and the present invention is not limited thereto.

Herein the gesture determining device 110 is assumed to be used for a finger guessing game; accordingly, the processing circuit 116 is configured to determine the gesture of the user's hand 130 as a first gesture (i.e., stone) if there exists one group of pixels; the processing circuit 116 is configured to determine the gesture of the user's hand 130 as a V-shaped gesture (i.e., scissors) if there exists two group of pixels; or the processing circuit 116 is configured to determine the gesture of the user's hand 130 as a five-open-finger gesture (i.e., clothes) if there exists two group of pixels. It is understood that the processing circuit 116 can be further configured to determine other gestures by defining some specific parameters, such as the distance between each two groups of pixels, and the length and width of each group of pixels. Furthermore, the processing circuit 116 is further configured to output corresponding gesture information GINF, served as a gesture determining result, after the gesture of the hand 130 is determined. Accordingly, the processor 120 can control the electronic apparatus 100 to perform a corresponding operation according to the gesture determining result.

Figure 5:
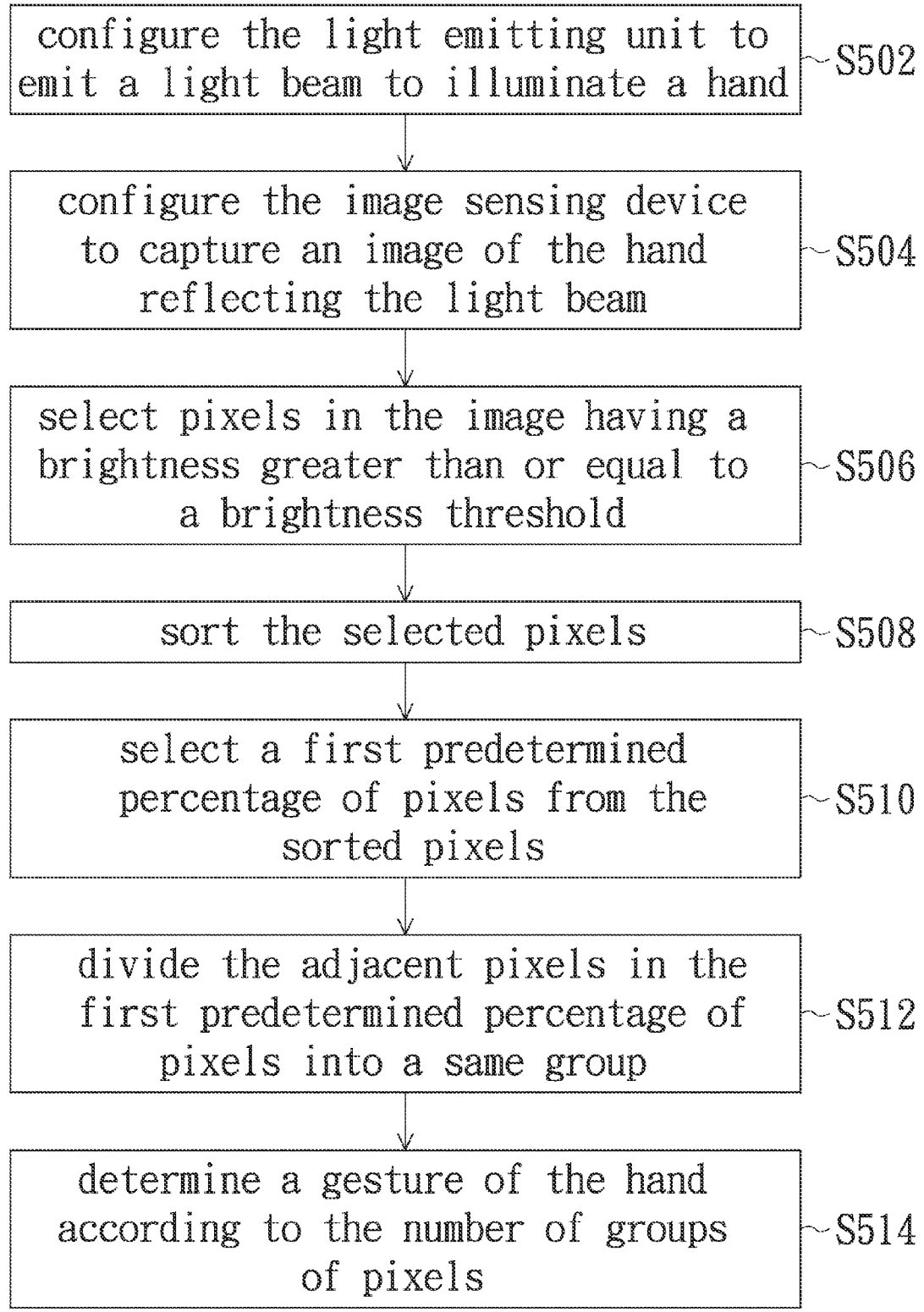
FIG. 5 is a flowchart illustrating an operation method for a gesture determining device in accordance with an embodiment of the present invention.

According to the above disclosure, the aforementioned gesture determining device can be summarized to have some basic operation steps by those ordinarily skilled in the art. FIG. 5 is a flowchart illustrating an operation method for a gesture determining device in accordance with an embodiment of the present invention; wherein the gesture determining device includes a light emitting unit and an image sensing device. The operation method in this embodiment includes steps of: configuring the light emitting unit to emit a light beam to illuminate a hand (step S502); configuring the image sensing device to capture an image of the hand reflecting the light beam (step S504); selecting pixels in the image having a brightness greater than or equal to a brightness threshold (step S506); sorting the selected pixels (step S508); selecting a first predetermined percentage of pixels from the sorted pixels (step S510); dividing the adjacent pixels in the first predetermined percentage of pixels into a same group (step S512); and determining a gesture of the hand according to the number of groups of pixels (step S514).

Figure 6:
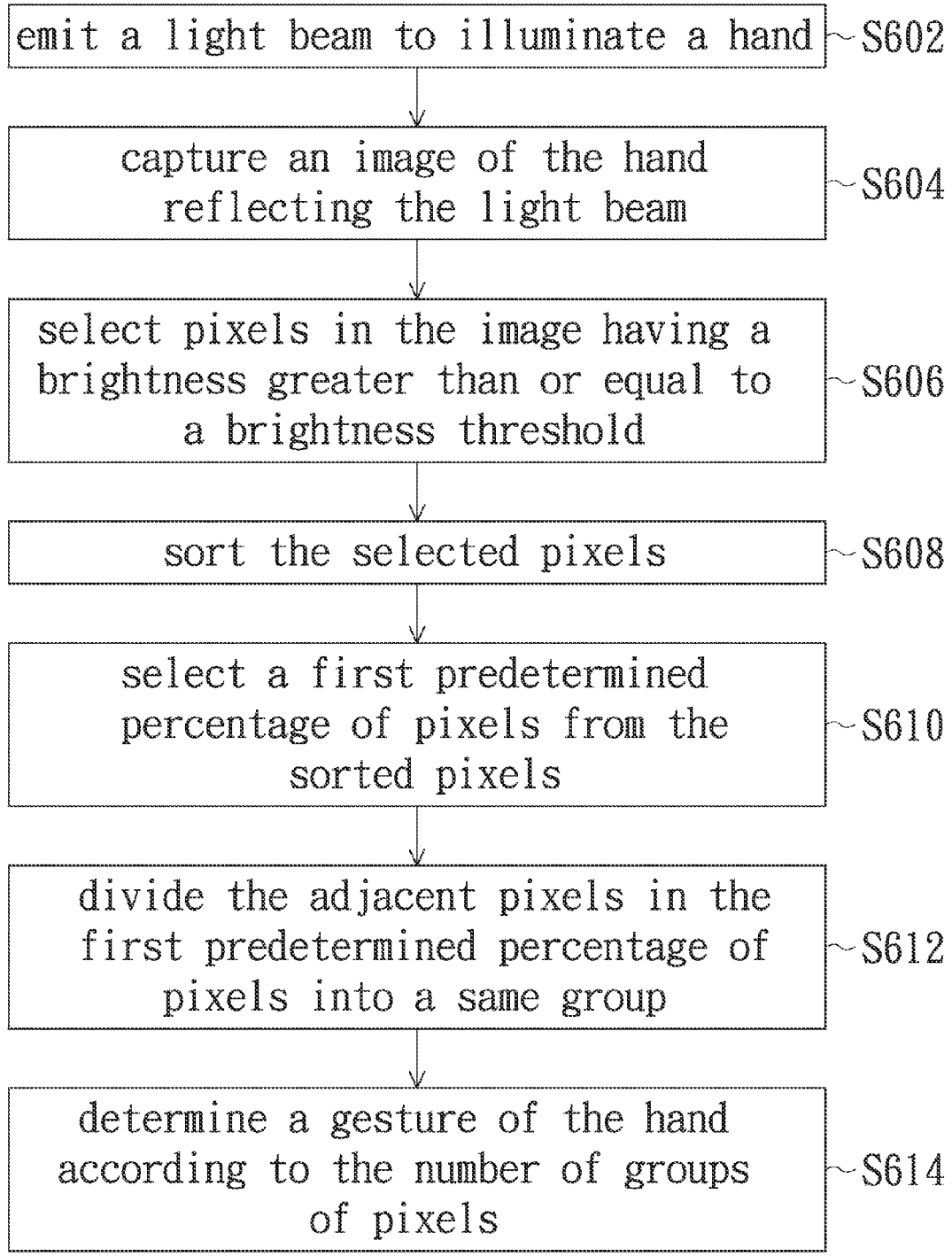
FIG. 6 is a flowchart illustrating a method for determining a gesture in accordance with an embodiment of the present invention.

Furthermore, according to the above disclosure, a method for determining a gesture can be summarized to have some basic steps by those ordinarily skilled in the art. FIG. 6 is a flowchart illustrating a method for determining a gesture in accordance with an embodiment of the present invention. The method in this embodiment includes steps of: emitting a light beam to illuminate a hand (step S602); capturing an image of the hand reflecting the light beam (step S604); selecting pixels in the image having a brightness greater than or equal to a brightness threshold (step S606); sorting the selected pixels (step S608); selecting a first predetermined percentage of pixels from the sorted pixels (step S610); dividing the adjacent pixels in the first predetermined percentage of pixels into a same group (step S612); and determining a gesture of the hand according to the number of groups of pixels (step S614).

In summary, by sequentially emitting a light beam to illuminate a hand, capturing an image of the hand reflecting the light beam, selecting pixels in the image having a brightness greater than or equal to a brightness threshold, sorting the selected pixels, selecting a first predetermined percentage of pixels from the sorted pixels and dividing the adjacent pixels in the first predetermined percentage of pixels into a same group, the present invention can determine a gesture of the hand according to the number of groups of pixels without some complicate operations, such as the object detection, edge detection, concave and convex polygons calculation. Thus, the present invention has improved gestures determination speed.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for determining a gesture, comprising:
  a light emitting unit configured to emit a light beam;
  an image sensing device configured to capture an image of a hand reflecting the light beam; and
  a processing circuit, electrically connected to the image sensing device, configured to obtain the image and determine a gesture of the hand by performing an operation on the image;
  wherein the operation comprises steps of:
    selecting pixels in the image having a brightness greater than or equal to a brightness threshold;
    sorting the selected pixels;
    selecting a first predetermined percentage of pixels from the sorted pixels;
    dividing the adjacent pixels in the first predetermined percentage of pixels into a same group; and
    determining the gesture of the hand according to the number of groups of pixels.

2. The device according to claim 1, wherein the processing circuit sorts the selected pixels along a first coordinate axes or a second coordinate axes of the image or according to the brightness of the selected pixels.

3. The device according to claim 1, wherein the processing circuit determines that the hand has a first gesture if the selected pixels are divided into one group.

4. The device according to claim 1, wherein the processing circuit determines that the hand has a V-shaped gesture if the selected pixels are divided into two groups.

5. The device according to claim 1, wherein the processing circuit determines that the hand has a five-open-finger gesture if the selected pixels are divided into at least three groups.

6. The device according to claim 1, wherein the processing circuit is further configured to output a corresponding gesture information after the gesture of the hand is determined.

7. The device according to claim 1, wherein the processing circuit is further configured to determine the gesture according to distances of the group of pixels to each other, length and width of each group of pixels.

8. An operation method for a gesture determining device, the gesture determining device comprising a light emitting unit and an image sensing device, the operation method comprising:
  configuring the light emitting unit to emit a light beam to illuminate a hand;
  configuring the image sensing device to capture an image of the hand reflecting the light beam;
  selecting pixels in the image having a brightness greater than or equal to a brightness threshold;
  sorting the selected pixels;
  selecting a first predetermined percentage of pixels from the sorted pixels;
  dividing the adjacent pixels in the first predetermined percentage of pixels into a same group; and
  determining a gesture of the hand according to the number of groups of pixels.

9. The operation method according to claim 8, wherein the selected pixels are sorted along a first coordinate axes or a second coordinate axes of the image or according to the brightness of the selected pixels.

10. The operation method according to claim 8, wherein the gesture is determined as a first gesture if the selected pixels are divided into one group.

11. The operation method according to claim 8, wherein the gesture is determined as a V-shaped gesture if the selected pixels are divided into two groups.

12. The operation method according to claim 8, wherein the gesture is determined as a five-open-finger gesture if the selected pixels are divided into at least three groups.

13. The operation method according to claim 8, wherein the gesture determining device outputs a corresponding gesture information after the gesture of the hand is determined.

14. The operation method according to claim 8, further comprising:
  determining the gesture according to distances of the group of pixels to each other, length and width of each group of pixels.

15. A method for determining a gesture, comprising:
  emitting a light beam to illuminate a hand;
  capturing an image of the hand reflecting the light beam;
  selecting pixels in the image having a brightness greater than or equal to a brightness threshold;
  sorting the selected pixels;
  selecting a first predetermined percentage of pixels from the sorted pixels;
  dividing the adjacent pixels in the first predetermined percentage of pixels into a same group; and determining a gesture of the hand according to the number of groups of pixels.

16. The method according to claim 15, wherein the selected pixels are sorted along a first coordinate axes or a second coordinate axes of the image or according to the brightness of the selected pixels.

17. The method according to claim 15, wherein the gesture is determined as a first gesture if the selected pixels are divided into one group.

18. The method according to claim 15, wherein the gesture is determined as a V-shaped gesture if the selected pixels are divided into two groups.

19. The method according to claim 15, wherein the gesture is determined as a five-open-finger gesture if the selected pixels are divided into at least three groups.

20. The method according to claim 15, further comprising:
    determining the gesture according to distances of the group of pixels to each other, length and width of each group of pixels.

* * * * *